US012176597B2

(12) United States Patent
Stelle, IV et al.

(10) Patent No.: US 12,176,597 B2
(45) Date of Patent: Dec. 24, 2024

(54) GRIP AND TRACTION ENHANCEMENT COMPONENT IN A BRACKET FOR MOUNTING AN ANTENNA ALIGNMENT DEVICE TO AN ANTENNA

(71) Applicant: Viavi Solutions Inc., Chandler, AZ (US)

(72) Inventors: Raleigh B. Stelle, IV, Chandler, AZ (US); Adam Woolsey, Indianapolis, IN (US)

(73) Assignee: Viavi Solutions Inc., Chandler, AZ (US)

( * ) Notice: Subject to any disclaimer, the term of this patent is extended or adjusted under 35 U.S.C. 154(b) by 111 days.

(21) Appl. No.: 18/054,011

(22) Filed: Nov. 9, 2022

(65) Prior Publication Data

US 2024/0154292 A1 May 9, 2024

(51) Int. Cl.
*H01Q 1/12* (2006.01)
*H01Q 7/00* (2006.01)

(52) U.S. Cl.
CPC ............ *H01Q 1/1221* (2013.01); *H01Q 7/00* (2013.01)

(58) Field of Classification Search
CPC ...... H01Q 1/12; H01Q 1/1207; H01Q 1/1221; H01Q 1/1242; H01Q 7/00
See application file for complete search history.

(56) References Cited

FOREIGN PATENT DOCUMENTS

| | | | | |
|---|---|---|---|---|
| CN | 211829177 U | * 10/2020 | ............... | H01Q 1/12 |
| CN | 211952094 U | * 11/2020 | ............. | F16M 11/28 |
| CN | 216413245 U | * 4/2022 | ............... | H01Q 1/12 |
| WO | WO-2021167718 A1 | * 8/2021 | ............... | H01Q 1/42 |

* cited by examiner

*Primary Examiner* — Hoang V Nguyen
(74) *Attorney, Agent, or Firm* — DLA Piper LLP (US)

(57) ABSTRACT

In an example mounting bracket for an antenna alignment device, a bracket component that abuts an antenna is provided. The bracket component has a relatively large surface area for a wider distribution of the applied clamping force, thereby minimizing high-pressure regions. Generally, the bracket component is made of a first piece and a second piece. The first piece is made of soft material such as e.g., rubber that abuts and grips an exterior surface of the antenna, thereby minimizing the slippage problem when the antenna surface is wet and or mossy. The second piece is made of rigid material such as metal or a metal alloy (e.g., an aluminum alloy) to maintain the structural integrity of the bracket component.

18 Claims, 13 Drawing Sheets

400

GRIP AND TRACTION ENHANCEMENT COMPONENT IN A BRACKET FOR MOUNTING AN ANTENNA ALIGNMENT DEVICE TO AN ANTENNA

BACKGROUND

Modern communication systems rely heavily on radio frequency wireless signals transmitted and received by antennas. On the transmit side, antennas receive fluctuating electrical currents through wires from connected circuitry and generate wireless signals as electromagnetic fields corresponding to the fluctuating electrical currents. On the receive side, antennas convert electromagnetic fields of the received wireless signals to electrical currents carried through wires to the connected circuitry. Because of directional oscillation of electrical and magnetic fields, wireless signaling through transmittal and receipt of electromagnetic fields is inherently directional: heavily influenced by the location of the signal source, multipathing, beamforming, and or other aspects associated with electromagnetic fields and electromagnetic radiation. Antenna alignment may therefore be desired for optimizing bandwidth, signal strength, and or other transmit/receive parameters. Antenna alignment may generally be performed using antenna alignment devices.

For the alignment, the antenna alignment devices are coupled to the antenna using mounting brackets. A mounting bracket, for example, has a first set of bracket components to receive an antenna alignment device and a second set of bracket components to attach to the antenna. Depending on the shapes and sizes of the antennas and or the antenna alignment devices, different types of mounting brackets have been used.

While conventional mounting brackets have worked for conventional antennas such as those made of fiberglass, there has been an increasing trend of using soft side antennas, i.e., antennas made of plastic with higher degree of flexibility; and the use of conventional mounting brackets in the soft side antennas creates several technical challenges. For example, the bracket components that attach to the antenna are rigid and have a smaller surface area, thereby creating a high-pressure region on the attachment surface when a clamping force is applied. Such high-pressure region may deform the soft side antenna, generally by disturbing the planar and or perpendicular orientation of the antenna, or even causing damage to the surface of the antenna.

Furthermore, even in the cases of conventional antennas, the conventional mounting brackets are susceptible to slippage, e.g., when the antenna is wet and or has moss on its surface. During these conditions, it becomes very difficult for a technician to mount an antenna alignment device to the antenna and stably maintain the coupling throughout the antenna alignment process.

As such, a significant improvement for mounting brackets for antenna alignment devices is desired.

SUMMARY

Embodiments disclosed herein attempt to solve the aforementioned and other technical problems and may provide other solutions as well. In an example disclosed mounting bracket for an antenna alignment device, a bracket component (referred to herein as an abutment pad) that abuts an antenna is provided. The bracket component has a relatively large surface area for a wider distribution of the applied clamping force, thereby minimizing high-pressure regions. Generally, the bracket component is made of a first piece and a second piece. The first piece is made of soft material such as rubber that abuts and grips an exterior surface of the antenna, thereby minimizing the slippage problem when the antenna surface is wet and or mossy. The second piece is made of rigid material such as metal or a metal alloy (e.g., an aluminum alloy) to maintain the structural integrity of the bracket component.

In an embodiment, a mounting bracket configured to mount an antenna alignment device to an antenna is provided. The mounting bracket may comprise an abutment pad configured to abut an external surface of the antenna, the abutment pad comprising a first piece and a second piece. The first piece may comprise a relatively soft material configured to have a traction with the external surface of the antenna. The second piece may comprise a relatively hard material configured to provide structural integrity to the abutment pad. The abutment pad is configured to provide a relatively larger abutting surface area between the mounting bracket and the external surface of the antenna.

In another embodiment, a method of mounting an antenna alignment device to an antenna is provided. The method may comprise attaching the antenna alignment device to a mounting bracket. The method may also comprise attaching the mounting bracket to the antenna, the attaching comprising: abutting an abutment pad of the mounting bracket to an external surface of the antenna, the abutment pad comprising a first piece and a second piece, the first piece comprising a relatively soft material having a traction with the external surface of the antenna, the second piece comprising a relatively hard material providing structural integrity to the abutment pad, and the abutment pad providing a relatively larger abutting surface area between the mounting bracket and the external surface of the antenna.

DETAILED DESCRIPTION OF SEVERAL EMBODIMENTS

A significant improvement for mounting brackets for mounting an antenna alignment is desired, particularly for soft side antennas and for handling slippery conditions when e.g., an antenna is wet and or mossy. Conventional mounting brackets have several technical shortcomings: for example, they create high pressure regions that disturb the planar and or perpendicular alignment of the antenna or even cause damage to the antenna; they further cannot maintain—due to slippage—a stable mount during e.g., wet and or mossy conditions. One or more embodiments disclosed herein significantly improve the mounting brackets used with antenna alignment devices. For instance, an abutment pad (generally referred to herein as a bracket component) is formed using a first piece with a relatively soft material such as rubber to abut the antenna surface and a second piece with a relatively hard material such as metal or a metal alloy. The relatively soft material can be further textured or patterned to enhance the grip of the abutment pad to the antenna surface. The relatively hard material maintains the structural integrity of the abutment pad. The abutment pad may have a relatively larger size to distribute the clamping force and avoid high-pressure regions, thereby minimizing the likelihood of disturbing the orientation of the antenna and minimizing the likelihood of deforming the antenna. The abutment pad may further have a fastening mechanism comprising e.g., multiple screw holes such that the abutment pad may be adjustably fastened to the mounting bracket in accordance with the disclosed principles.

Figure 1A:
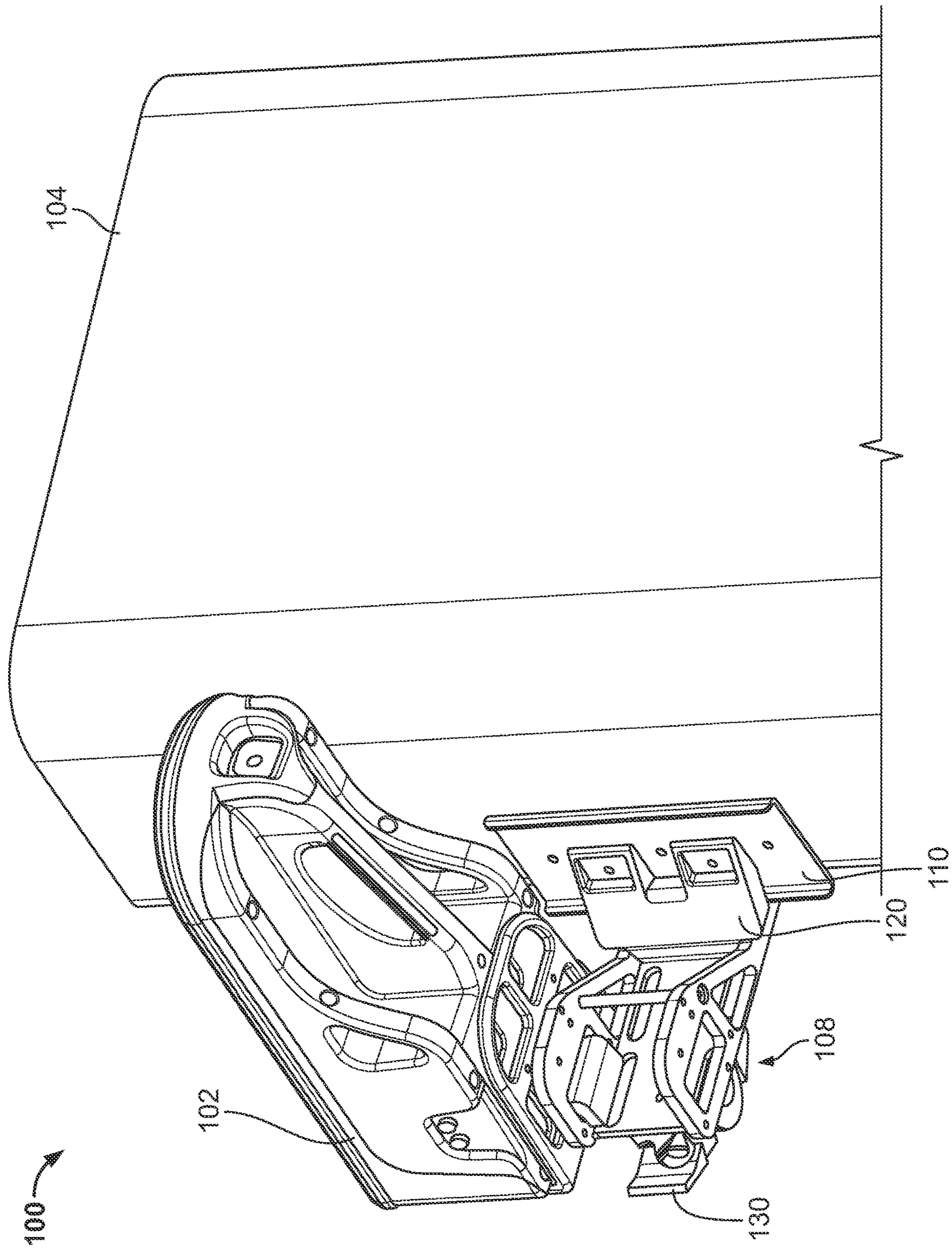
FIGS. 1A-1D show several views of an example antenna alignment environment, based on the principles disclosed herein.
Figure 1B:
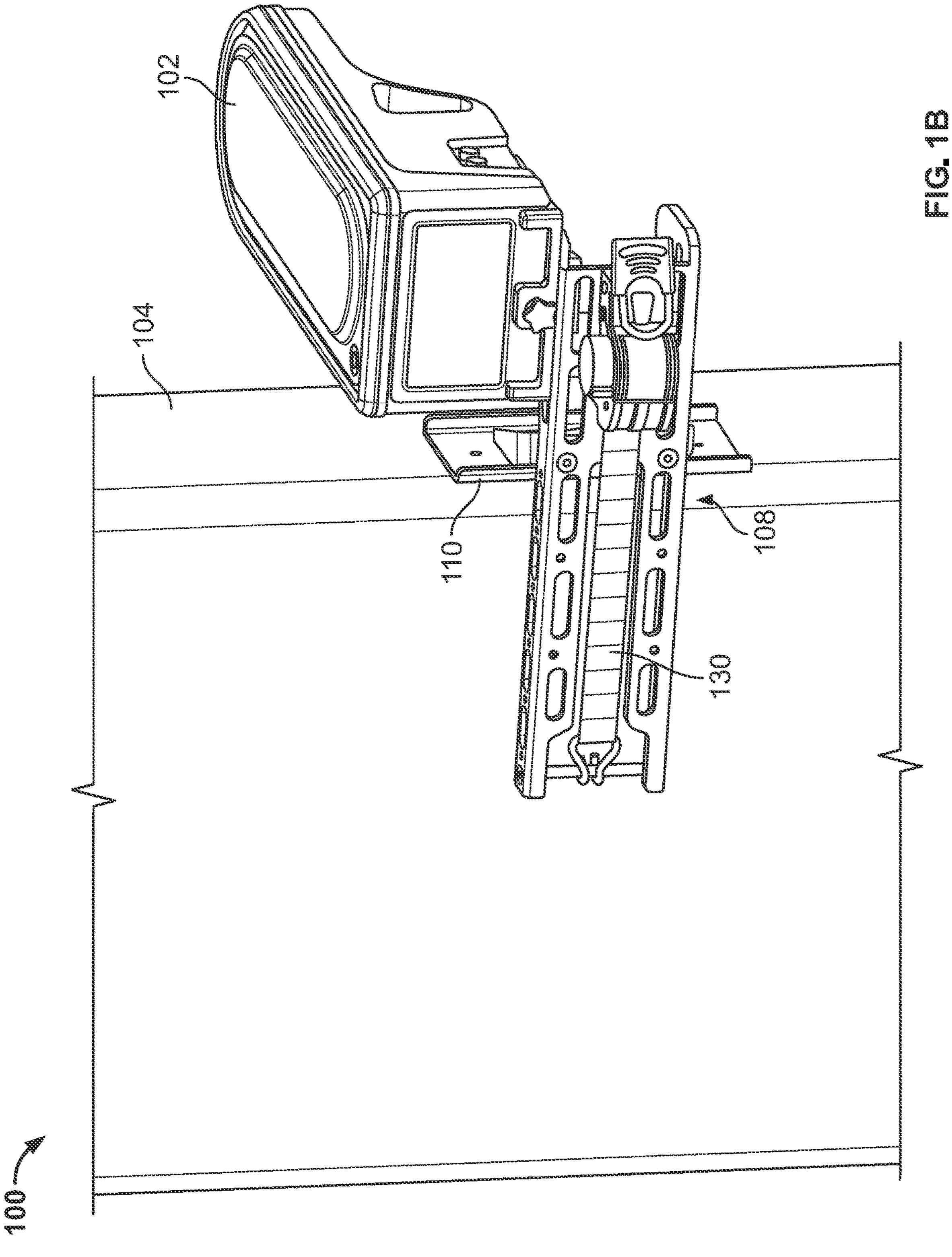
Figure 1C:
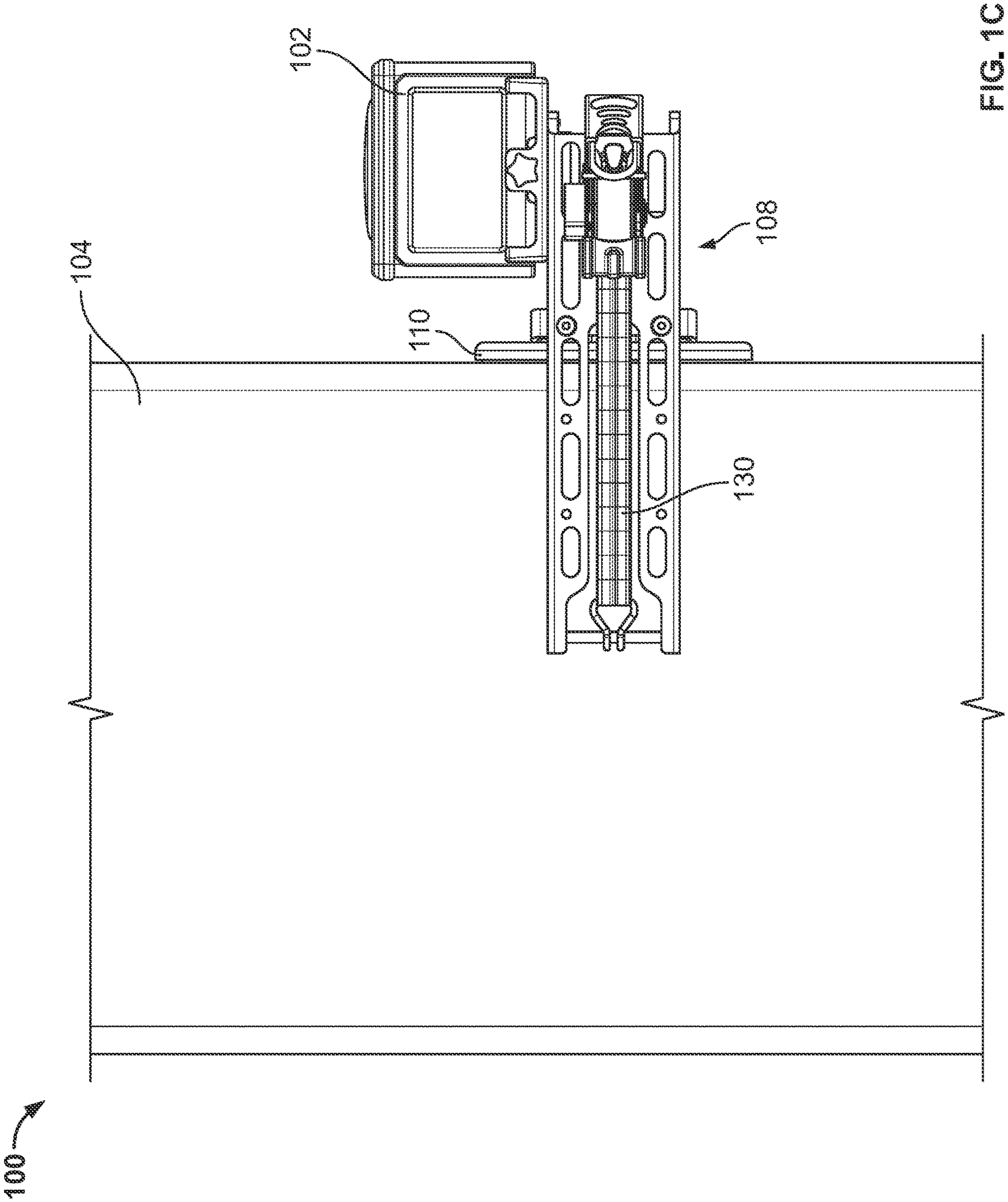
Figure 1D:
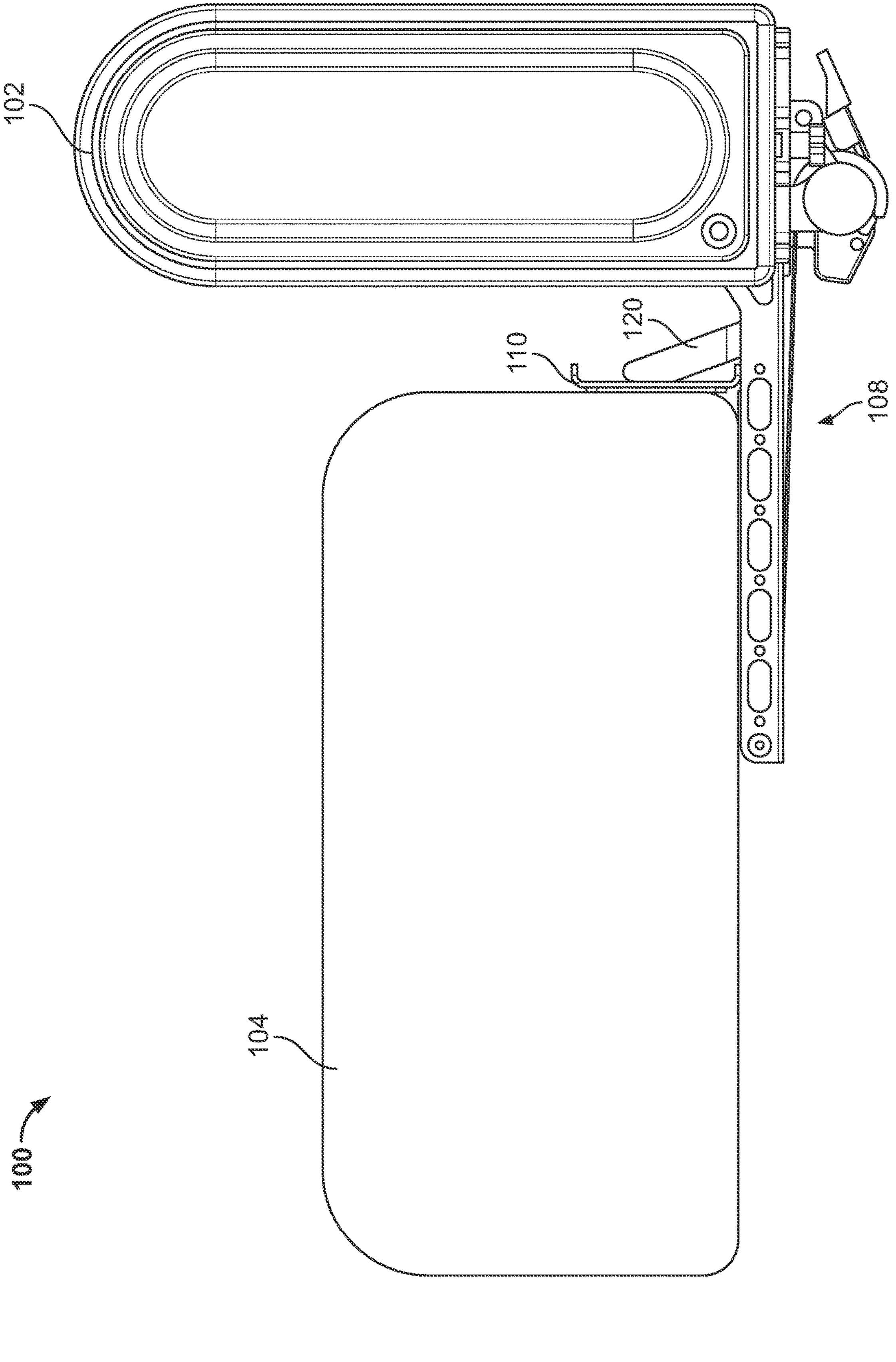

FIGS. 1A-1D show several views of an example antenna alignment environment 100 (also referred to as antenna tuning environment), based on the principles disclosed herein. Particularly, FIG. 1A shows a front perspective view, FIG. 1B shows a back perspective view, FIG. 10 shows a back view, and FIG. 1D shows a top view of the environment 100. As shown, the antenna alignment environment 100 generally includes an antenna alignment device 102 mounted to an antenna 104 using a mounting bracket 108. The antenna 104 itself may be disposed on a pole and or any other supporting structure (not shown). Generally, the antenna 104 may be located on any type of structure such as an antenna tower, rooftop, treetop, building wall, vehicle top, satellite, and or any other type of structure. Furthermore, the antenna 104 can be any type of antenna, including a dome antenna, loop antenna, Yagi-type antenna, and or any type of antenna that may have to be aligned for optimal performance. Although the antenna 104 is described herein as a singular antenna, a combination of antennas (including active antenna arrays) that may have to be aligned should also be considered within the scope of this disclosure. The antenna 104 may use any kind of transmit/receive frequency, e.g., the antenna 104 may be a microwave antenna used in a cellular communications tower.

The antenna alignment device 102 may include any type of device that is used to align (or tune) the antenna 104. For instance, the antenna alignment device 102 may be formed using any type of cameras, sensors, displays, voltmeters, and or other components configured to align the antenna 104. When mounted to the antenna 104, the orientation of the antenna alignment device 102 may correspond to the orientation of the antenna 104. The alignment may include parameters such as roll, pitch (also referred to as tilt), and or azimuth; as understood in the art.

The mounting bracket 108 may include any type of components that mount the antenna alignment device 102 to the antenna 104. For example, a first set of bracket components may attach to the antenna alignment device 102 and a second set of bracket components may attach to the antenna 104 thereby creating a coupling between the antenna alignment device 102 and the antenna 104. An example bracket component (specifically referred to as abutment pad), based on the embodiments disclosed herein, is labeled as 110 throughout the Figures. The abutment pad 110, as shown in more detail in FIGS. 3A-3C, comprises a relatively soft first piece to abut to the antenna 104 and a relatively hard second piece to maintain the structural integrity of the abutment pad 110. The abutment pad 110 may be adjustably attached to a bracket component 120 (e.g., an angled piece) of the mounting bracket 108, e.g., using screws (as shown in FIG. 2F, screws 140 passing through the screw holes 116). The clamping or tightening force may be applied on the mounting bracket 108 using, e.g., a ratchet mechanism 130.

Figure 2A:
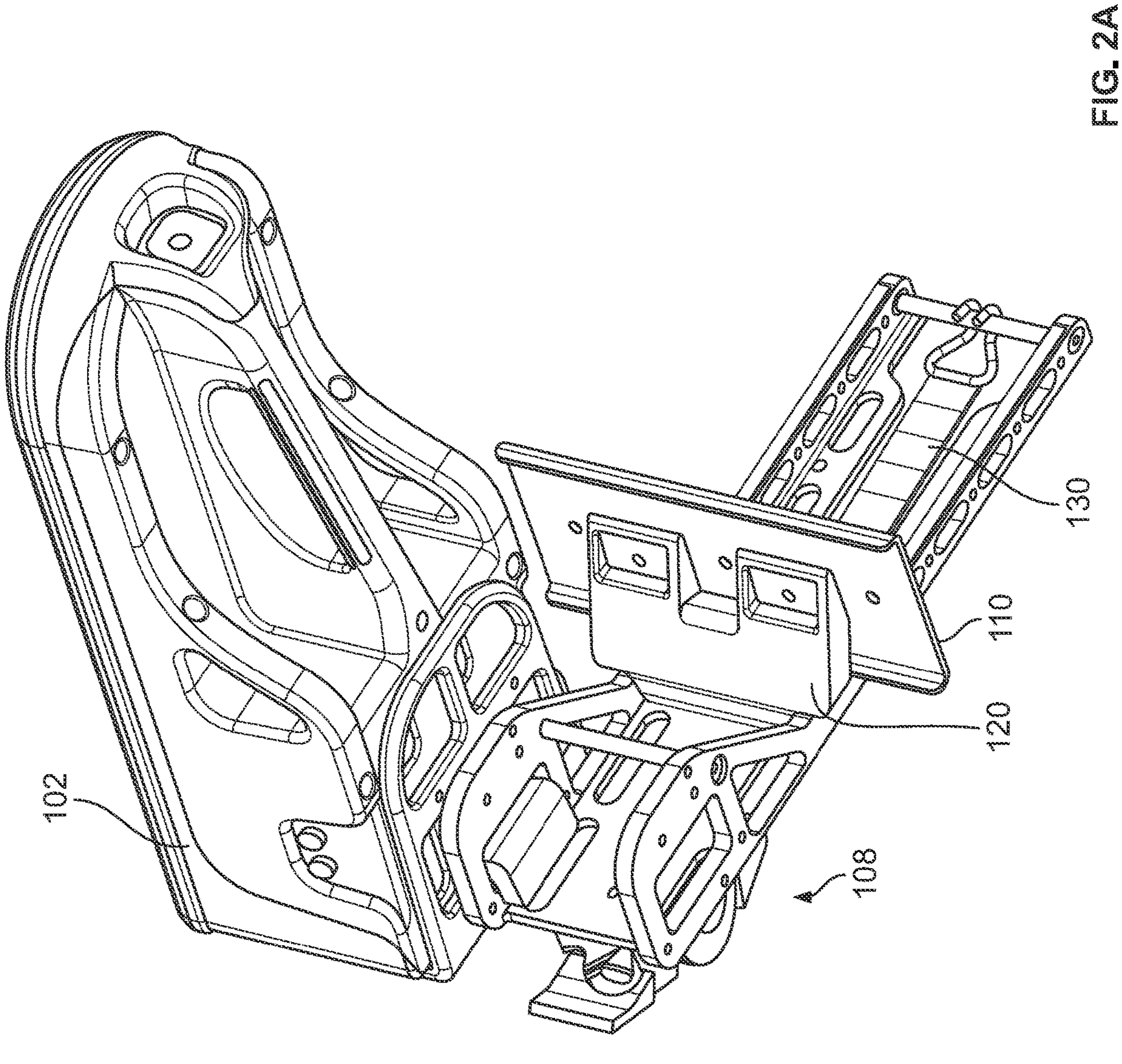
FIGS. 2A-2F show several views of an example coupling between an antenna alignment device and a mounting bracket within the antenna alignment environment shown in FIGS. 1A-1D, based on the principles disclosed herein, based on the principles disclosed herein.
Figure 2B:
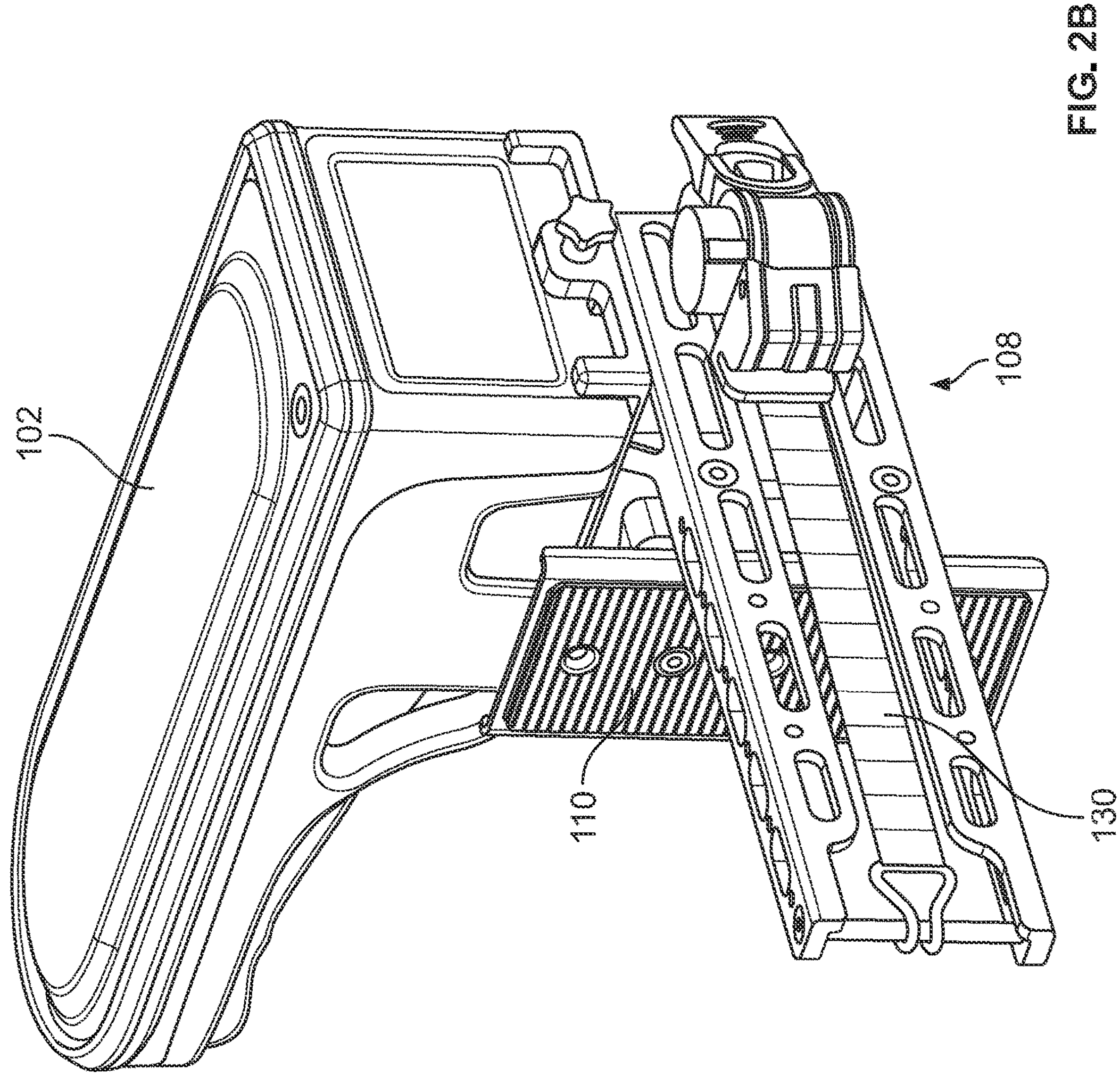
Figure 2C:
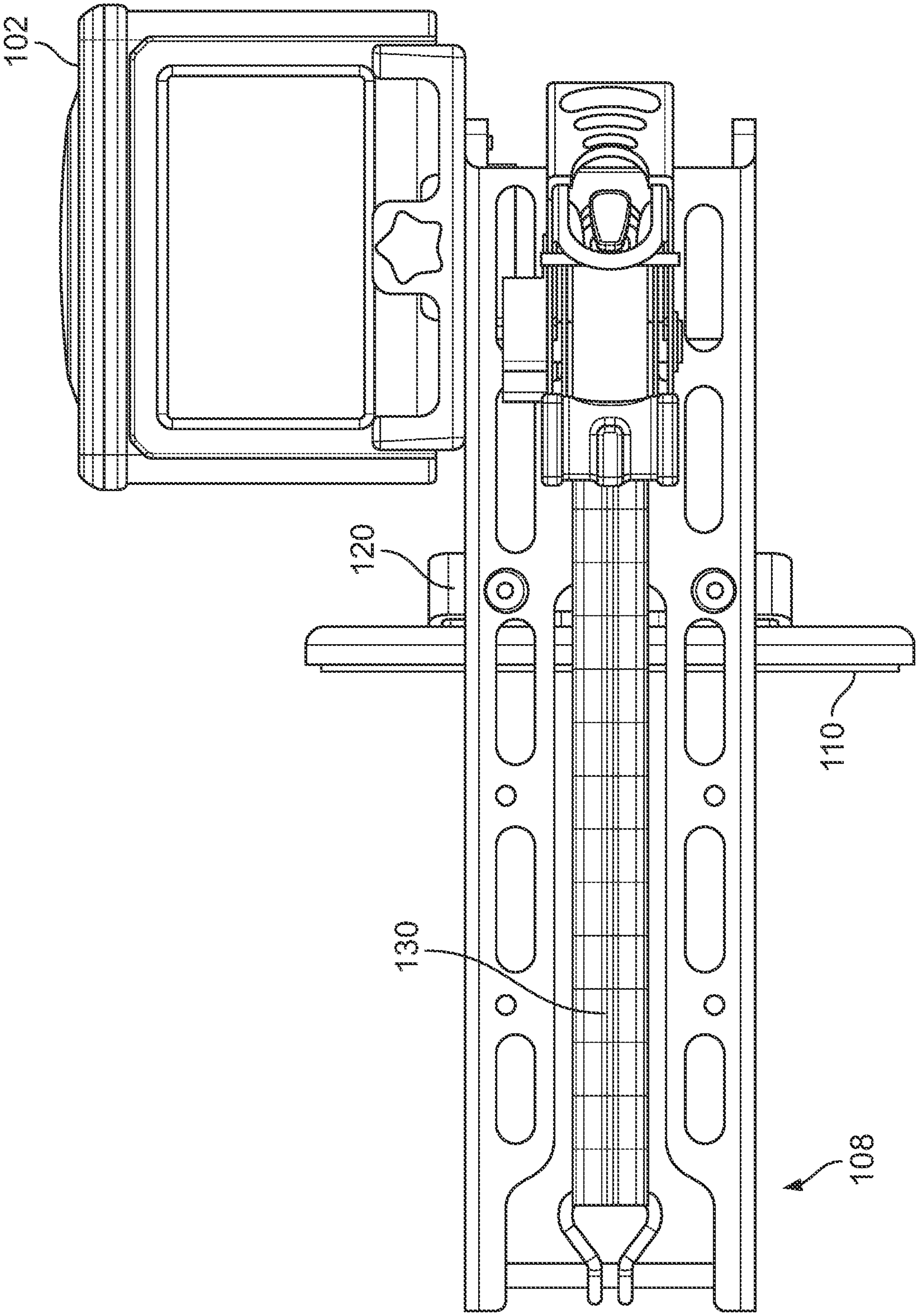
Figure 2D:
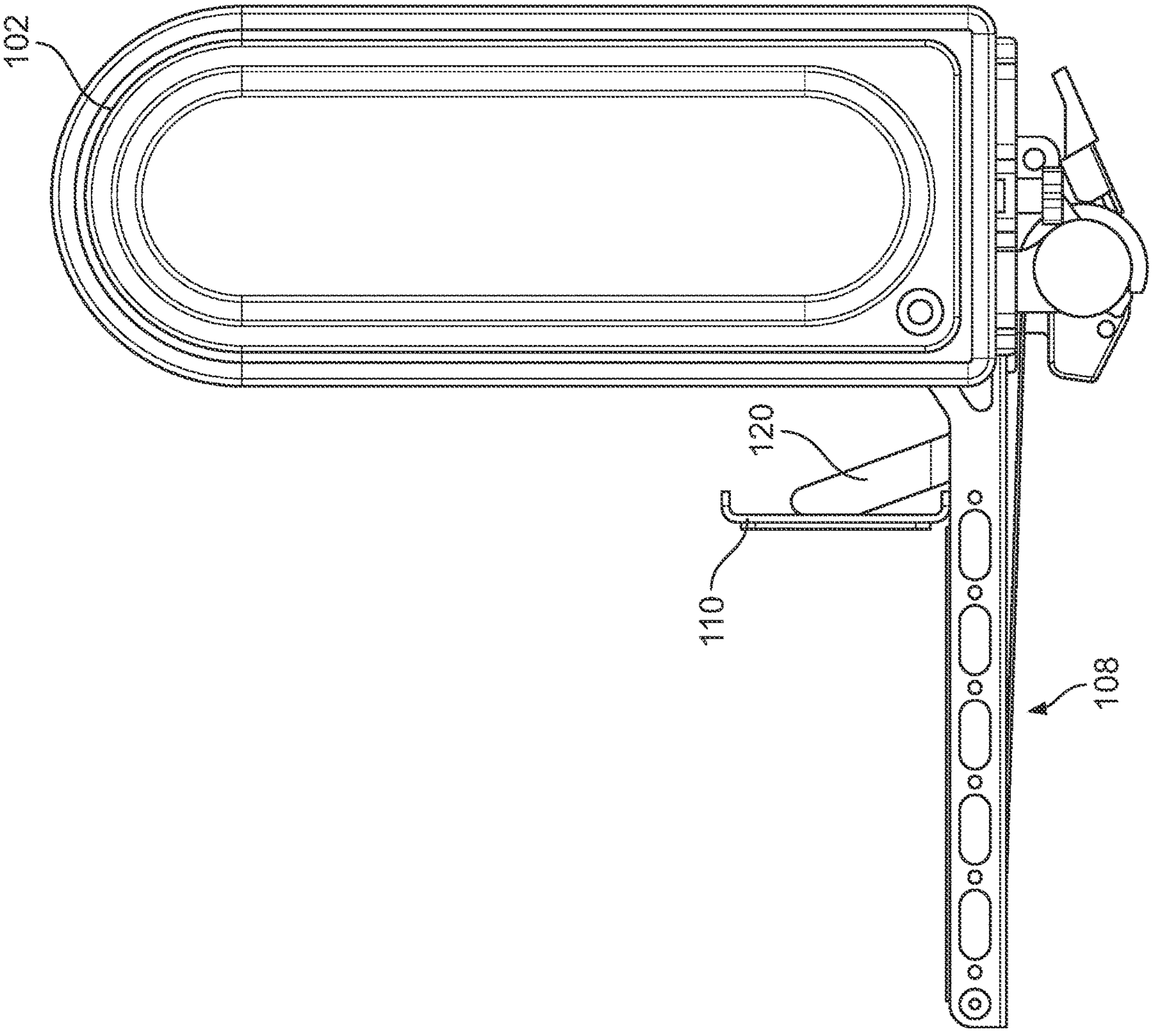
Figure 2E:
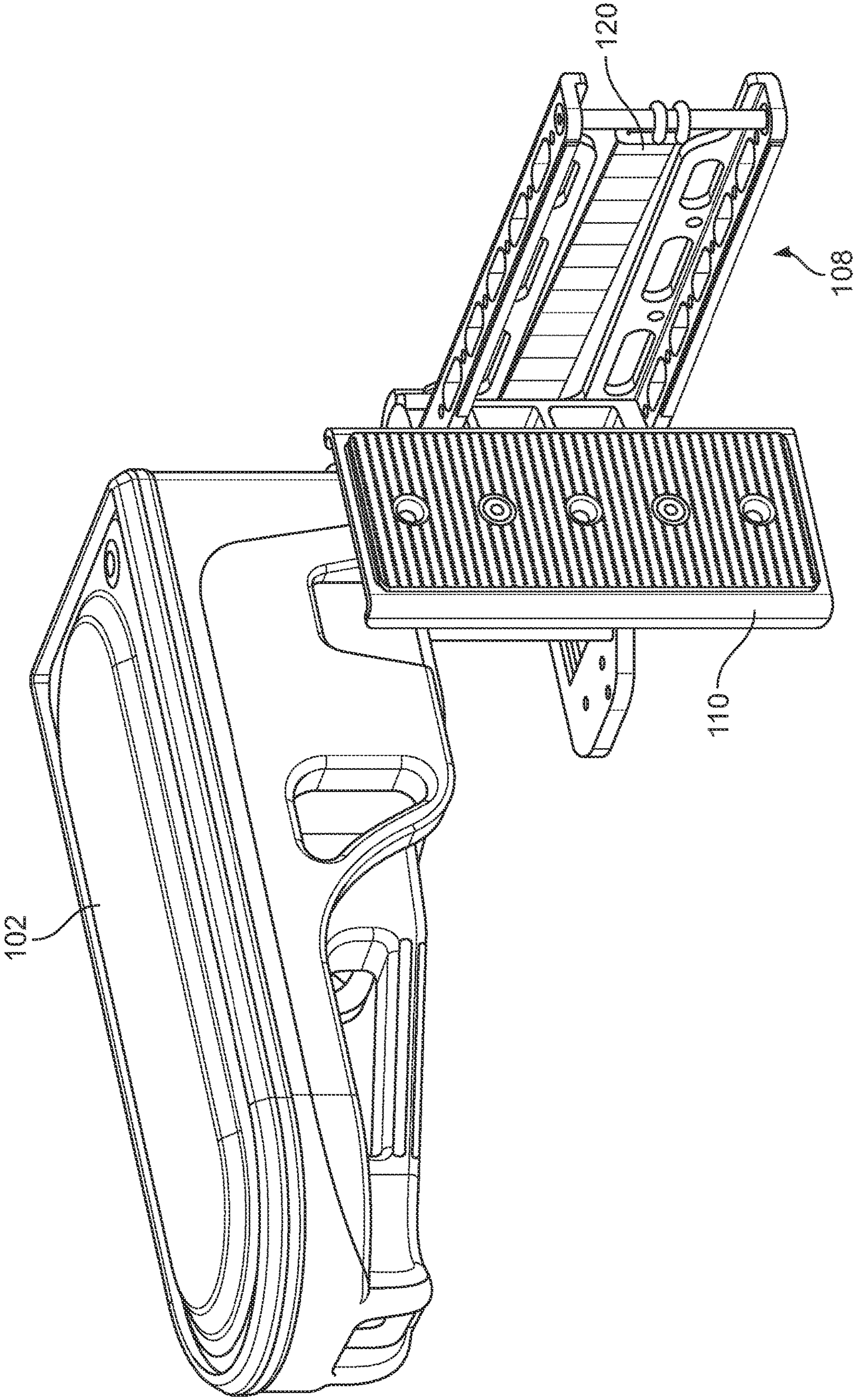
Figure 2F:
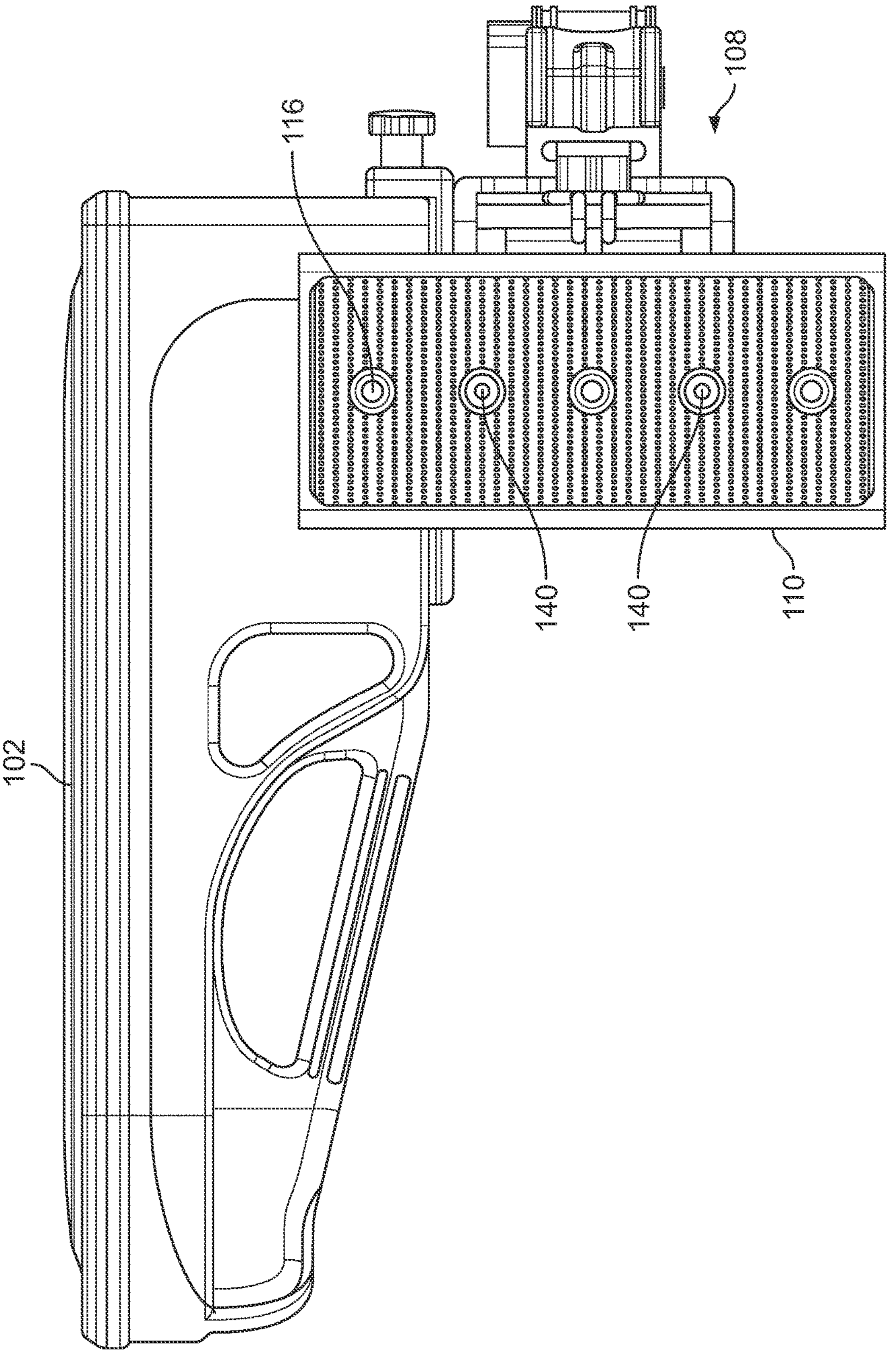

FIGS. 2A-2F show several views of an example coupling between the antenna alignment device 102 and the mounting bracket 108 bracket within the antenna alignment environment 100 shown in FIGS. 1A-1D, based on the principles disclosed herein. Particularly, FIG. 2A shows a front perspective view, FIG. 2B shows a back perspective view, FIG. 2C shows a back view, FIG. 2D shows a top view, FIG. 2E shows a side perspective view, and FIG. 2F shows a side view of the coupling. As shown, the mounting bracket 108 includes the abutment pad 110 that is configured to abut an antenna (e.g., as shown in the example environment 100). The abutment pad 110 may be adjustably attached to a bracket component 120 (e.g., an angled piece) of the mounting bracket 108, e.g., using screws (as shown in FIG. 2F, screws 140 passing through the holes 116). The clamping or tightening force may be applied on the mounting bracket 108 using, e.g., a ratchet mechanism 130.

Figure 3A:
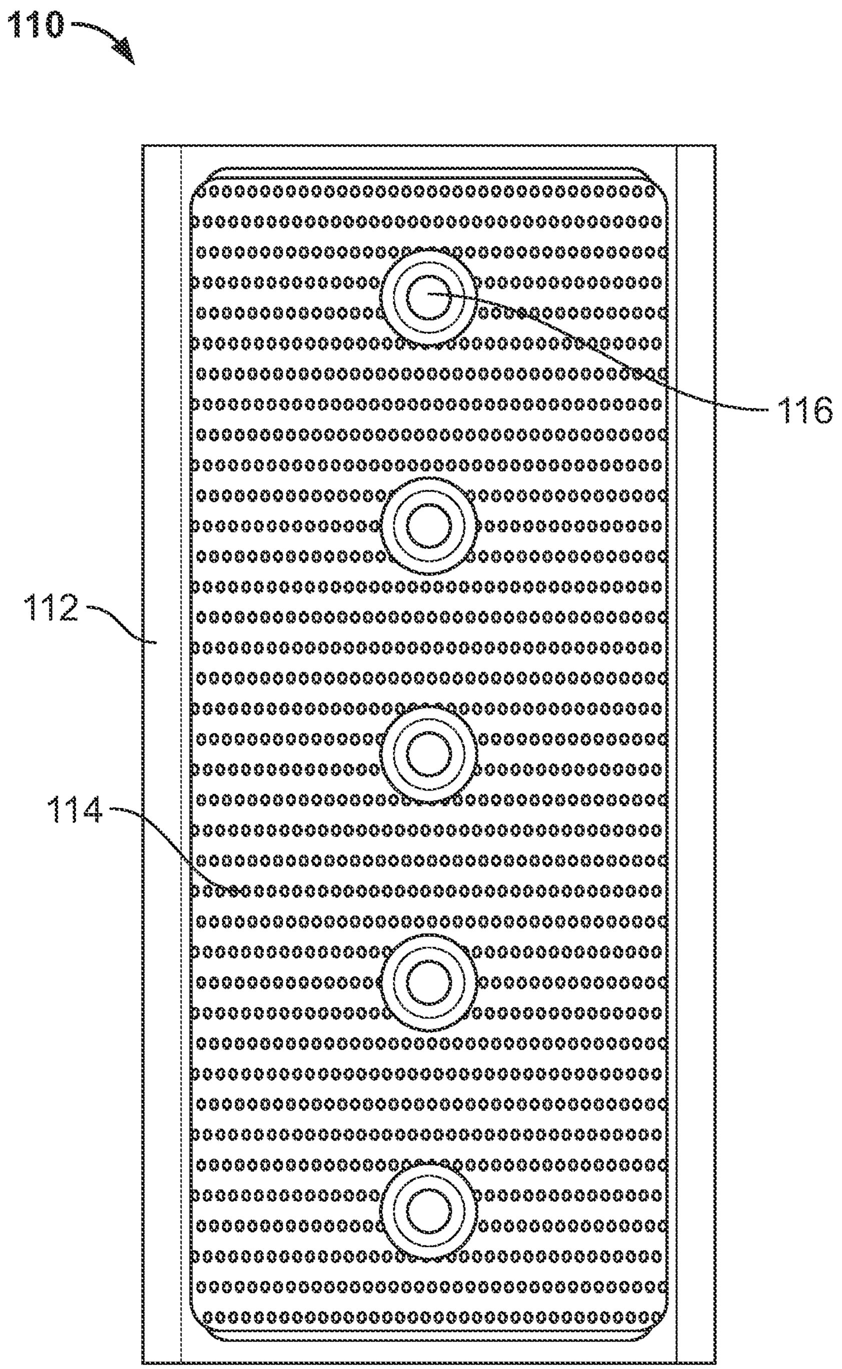
FIGS. 3A-3C show several views of a bracket component within the mounting bracket shown in FIGS. 2A-2F, based on the principles disclosed herein.
Figure 3B:
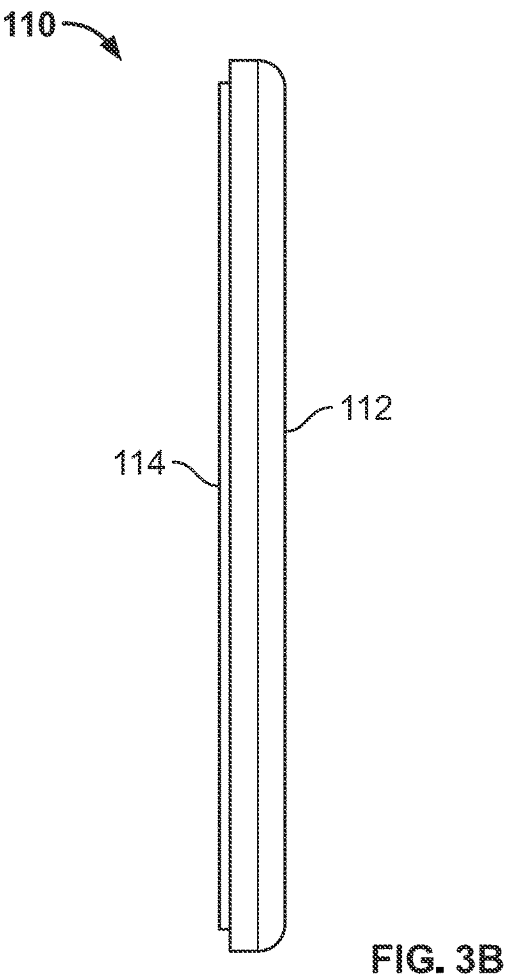
Figure 3C:
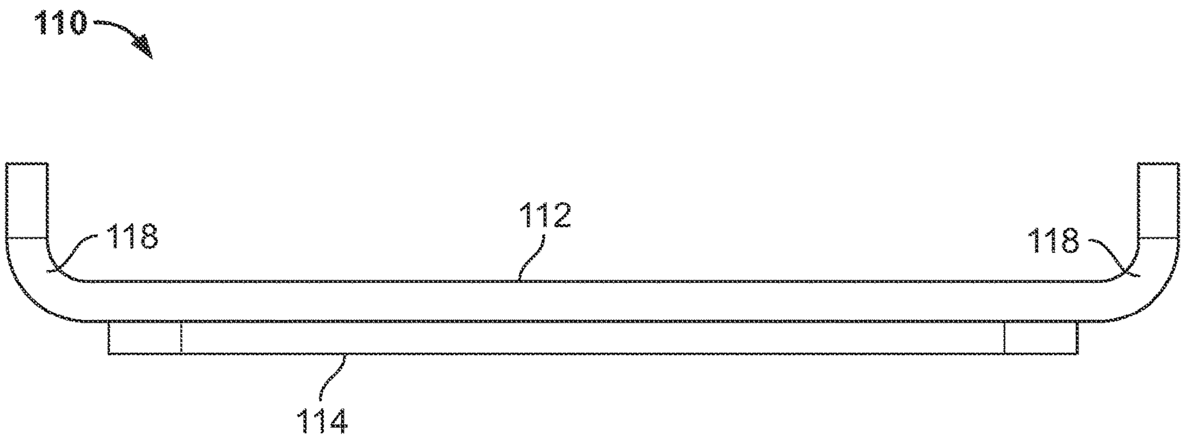

FIGS. 3A-3C show detailed views of the abutment pad 110 based on the principles disclosed herein. Particularly, FIG. 3A shows a front view, FIG. 3B shows a side view, and FIG. 3C shows a top view of the abutment pad 110. It should be understood that the shown form factor is merely an example, and abutment pads with any form factor should be considered within the scope of this disclosure. For example, the abutment pad 110 may have a circular shape, an oval shape, or a polygonal shape (e.g., a trapezoid, pentagon, octagon, etc.).

As described above, the abutment pad 110 may be constructed of a second piece 112 and first piece 114. The second piece 112 is made of relatively hard material and the first piece 114 is made of relatively soft material. The second piece 112 may be formed of any metal, metal alloy, or metallic material. For instance, the second piece 112 may be formed using 5052 aluminum alloy. As shown in FIG. 3C, the second piece 112 may have rounded corners 118 to maintain its structural integrity. The first piece 114 that directly abuts the antenna 104 may be formed of rubber and or any other type of polymer material. Furthermore, the first piece 114 may be textured and or patterned (as shown in FIG. 3A) to increase traction and reduce skid between the first piece 114 and the antenna 104. The relatively soft material used for the first piece 114 may further reduce an abrasion of the surface of the antenna 104. The two-piece design is also provided as an example, and abutment components with any number of pieces should also be considered within the scope of this disclosure.

The abutment pad 110 may further include a fastening mechanism that fastens the abutment pad 110 to the mounting bracket 108. For example, screw holes 116 are provided. One or more of the provided screw holes 116 may be used to fasten the abutment pad 110 to the mounting bracket 108. If the fastening needs an adjustment, screws in the screw holes 116 may be removed and alternate screw holes 116 may be used. Such flexibility in fastening allows for the abutment pad 110 to be fastened at different points to the mounting bracket 108. Furthermore, the abutment pad 110 may be fastened at any orientation to the mounting bracket 108. It should however be understood that the use of the screw holes is just an example fastening mechanism and should not be considered limiting. Any other type of mechanical fastening mechanism should also be considered within the scope of this disclosure. Regardless of the type of fastening mechanism, the flexibility in adjustment aids in avoiding obstacles when mounting the antenna adjustment device 102 to the antenna 104.

In one embodiment, the dimensions of the first piece 114 may be 3.175 mm (thickness)*78 mm (width)*190 mm (height); and the dimensions of the second piece 112 may be 3.175 mm (thickness)*94 mm (width)*200 mm (height). These dimensions are for exemplary purposes only and should not be considered limiting. First and second pieces with any suitable dimension should be considered within the scope of this disclosure.

Figure 4:
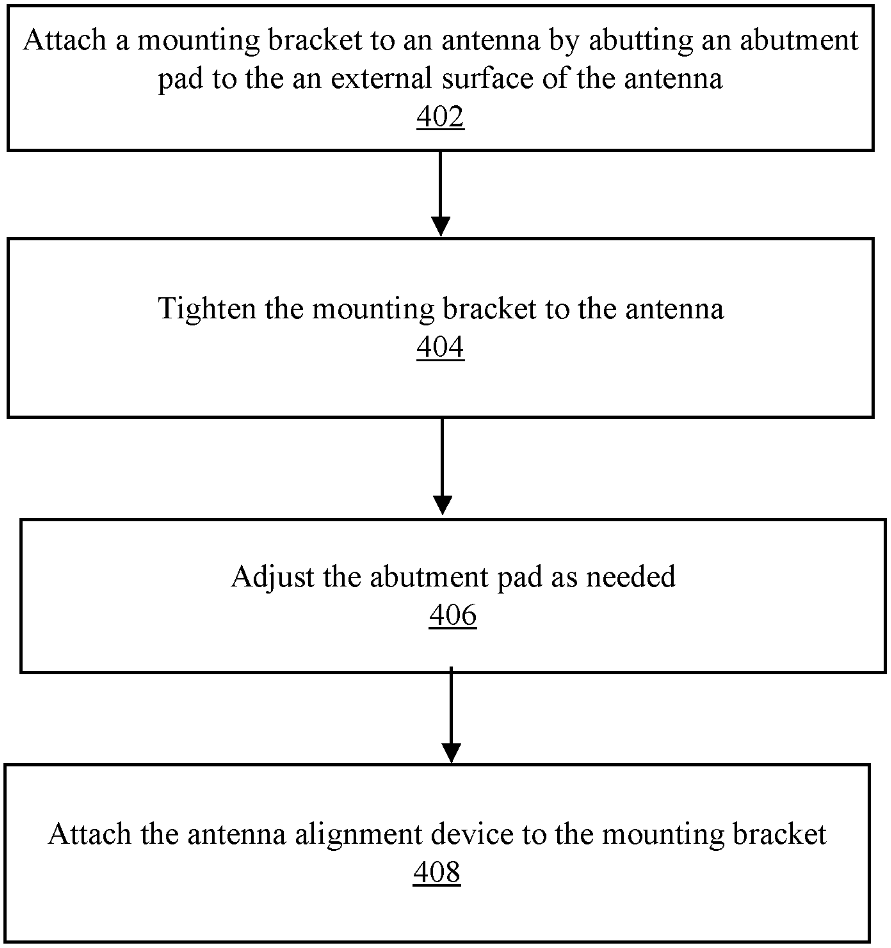
FIG. 4 shows a flow diagram of mounting an antenna alignment device to an antenna, based on the principles disclosed herein.

FIG. 4 shows a flow diagram of an example method 400 of mounting an antenna alignment device to an antenna, based on the principles disclosed herein. It should be understood that the steps of the method 400 are shown as an example of the disclosed principles and should not be considered limiting. Methods with additional, alternative, or fewer number of steps should also be considered within the scope of this disclosure. Furthermore, the shown order of steps are for illustration purposes, and the steps may be performed in any sequence.

At step 402, a mounting bracket may be attached to an antenna. The attaching may include abutting an abutment pad to an external surface of the antenna. First, the abutment pad may be coupled to the mounting bracket. The coupling may be performed using any kind of mechanical fasteners. For instance, the abutment pad may have a plurality of screw holes, which may be used to screw tighten the abutment pad to the mounting bracket. Once the abutment pad is coupled to the mounting bracket, the abutment pad is abutted to an external surface of the antenna. That is, the abutment pad is the major contact surface between the mounting bracket and the antenna.

At step 404, the mounting bracket may be tightened to the antenna. The tightening may be through any kind of tightening and or clamping mechanism. For example, a ratchet mechanism may be used for the tightening. The tightening increases the frictional force between the antenna and the antenna alignment device thereby maintaining the coupling between them.

As described throughout the disclosure, the abutment pad has a relatively larger surface area to distribute the tightening or the clamping force against the external surface of the antenna. This distribution mitigates high-pressure regions thereby minimizing the disturbance in antenna orientation and also minimizing the likelihood of the antenna being damaged or destroyed. Furthermore, the abutment pad has a relatively soft first piece abutting with the antenna. The larger surface of this soft first piece provides a better traction for the mounting bracket to have a steady and stable coupling even when the external surface of the antenna is wet and or mossy.

At step 406, the abutment pad is adjusted as needed. For example, the currently used screws on a first set of screw holes may be unscrewed and used for a second set of holes. This adjustment allows an easy sliding of the abutment pad vis-à-vis the other components of the mounting bracket. The adjustment also allows the changing of the orientation of the abutment pad vis-à-vis the other components of the mounting bracket. It should however be understood that the screw based fastening example is just an example and should not be considered limiting. Any kind of adjustable fastening mechanism should be considered within the scope of this disclosure.

At step 408, the antenna alignment device may be attached to the mounting bracket. That is, the antenna alignment device may be attached to a first set of components in the mounting bracket, which are configured to receive the antenna alignment device. For example, the antenna alignment device may be screwed to the first set of components.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A mounting bracket configured to mount an antenna alignment device to an antenna, the mounting bracket comprising:
- an abutment pad configured to abut an external surface of the antenna, the abutment pad comprising a first piece and a second piece,
  - the first piece comprising a relatively soft material configured to have traction with the external surface of the antenna, and
  - the second piece comprising a relatively hard material configured to provide structural integrity to the abutment pad;
- the abutment pad further comprising a plurality of screw holes configured to receive screw fasteners to fasten the abutment pad to the mounting bracket; and
- the abutment pad configured to provide a relatively larger abutting surface area between the mounting bracket and the external surface of the antenna.

2. The mounting bracket of claim 1, wherein the antenna comprises a soft side antenna, and the relatively larger abutting surface area minimizes deformity caused by the mounting bracket on the soft side antenna.

3. The mounting bracket of claim 1, wherein the relatively larger abutting surface area minimizes slippage between the mounting bracket and the antenna when the antenna is wet and or mossy.

4. The mounting bracket of claim 1, wherein the first piece is formed of a rubber.

5. The mounting bracket of claim 1, wherein the first piece is formed of rubber that is textured or patterned.

6. The mounting bracket of claim 1, wherein the second piece is formed of a metal or a metal alloy.

7. The mounting bracket of claim 1, wherein the second piece is formed of aluminum or an aluminum alloy.

8. The mounting bracket of claim 1, wherein the second piece has rounded edges to increase the structural integrity of the abutment pad.

9. The mounting bracket of claim 1, wherein the plurality of screw holes is configured to allow an adjustable fastening of the abutment pad to the mounting bracket.

10. A method of mounting an antenna alignment device to an antenna, the method comprising:

attaching the antenna alignment device to a mounting bracket;

attaching the mounting bracket to the antenna, the attaching comprising abutting an abutment pad of the mounting bracket to an external surface of the antenna, the abutment pad comprising a first piece and a second piece, the first piece comprising a relatively soft material having a traction with the external surface of the antenna, and the second piece comprising a relatively hard material providing a structural integrity to the abutment pad;

fastening the abutment pad to the mounting bracket by using screws on a plurality of screw holes provided on the abutment pad; and the abutment pad providing a relatively larger abutting surface area between the mounting bracket and the external surface of the antenna.

11. The method of claim 10, wherein the antenna comprises a soft side antenna, and the relatively larger abutting surface area minimizes deformity caused by the mounting bracket on the soft side antenna.

12. The method of claim 10, wherein the relatively larger abutting surface area minimizes slippage between the mounting bracket and the antenna when the antenna is wet and or mossy.

13. The method of claim 10, wherein the first piece is formed of a rubber.

14. The method of claim 10, wherein the first piece is formed of rubber that is textured or patterned.

15. The method of claim 10, wherein the second piece is formed of a metal or a metal alloy.

16. The method of claim 10, wherein the second piece is formed of aluminum or an aluminum alloy.

17. The method of claim 10, wherein the second piece has rounded edges to increase the structural integrity of the abutment pad.

18. The method of claim 10, the fastening the abutment pad further comprising:

fastening the abutment pad to the mounting bracket using a screw on a first screw hole of the plurality of screw holes; and adjusting the fastening by taking off the screw from the first screw hole and using the screw on a second screw hole of the plurality of screw holes.

* * * * *